United States Patent [19]

Kusakawa et al.

[11] Patent Number: 4,603,188
[45] Date of Patent: Jul. 29, 1986

[54] CURABLE URETHANE COMPOSITION

[75] Inventors: Susumu Kusakawa; Yoshiyuki Itoh, both of Yokkaichi; Seiichi Morooka, Mie; Kenji Komazawa, Yokkaichi; Kenji Ueda, Itami, all of Japan

[73] Assignees: Itoh Seiyu Kabushiki Kaisha, Yokkaichi; Sanyu Resin Kabushiki Kaisha, Osaka, both of Japan

[21] Appl. No.: 753,470

[22] Filed: Jul. 10, 1985

[51] Int. Cl.$^4$ ............................................. C08G 18/36
[52] U.S. Cl. ..................................... 528/60; 528/74.5
[58] Field of Search .............................. 528/60, 74.5

[56] References Cited

U.S. PATENT DOCUMENTS 4,008,197  2/1977  Brauer et al. ...................... 260/31.6
4,313,858  2/1982  Earing et al. ......................... 260/18

Primary Examiner—Maurice J. Welsh
Attorney, Agent, or Firm—Armstrong, Nikaido, Marmelstein & Kubovcik

[57] ABSTRACT

A new curable urethane composition which comprises a polyhydroxyl component and a polyisocyanate component, wherein said polyhydroxyl component comprises 80 to 10% by weight of an interesterification product
 (A) which is the reaction product of castor oil (a1) and substantially non-hydroxyl-containing naturally occurring triglyceride oil (a2) and, optionally, low molecular weight polyol (a3) and
20 to 90% by weight of a polybutadiene based polyol (B).

The composition has a sufficiently low viscosity to be easily handled and forms a polyurethane resin with excellent elongation and electrical properties.

9 Claims, No Drawings

CURABLE URETHANE COMPOSITION

BACKGROUND OF THE INVENTION

This invention relates to a novel curable urethane composition. More particularly, this invention relates to a novel solventless urethane composition having a sufficiently low viscosity to be easily handled and forming a polyurethane resin with excellent elongation and electrical properties.

Use of castor oil as a polyol in the preparation of polyurethane has well been known.

Castor oil is a triglyceride and its fatty acid composition consists of approximately 90% by weight of ricinoleic acid and 10% by weight of non-hydroxyl-containing fatty acid.

Therefore castor oil is a mixture of 70% by weight of triricinolein and 30% by weight of diricinolein. Then, it has a functionality of 2.7 as a polyol. Moreover, the castor oil backbone has a large hydrocarbon sidechain, which tends to force the hydroxyl groups apart. That chemical structure makes castor oil a better urethane material than the well known polyesterpolyols and polyetherpolyols especially as long as electrical property and water resistance are concerned.

Therefore, use of castor oil as a polyol in the preparation of polyurethane is widespread, especially in the electrical industries.

Recently, however, the trend toward minimization of electronic elements has come to require a more flexible resin. And the requirements to be met by electrical insulating materials with regard to mechanical strength, electrical property and temperature resistance have been increased considerably.

In order to get a more flexible polyurethane resin various kinds of means have been proposed and employed.

T. C. Patton et al. (J.A.O.C.S. 36, 149(1959)) have reported various ricinoleic acid polyols for urethane foams and coatings. Some of them, which have less functionality than castor oil, give more elastic polyurethane resins than castor oil does.

In the same manner, Japanese Un-examined Patent Publication No. 85819/1982 (CA: 97 (20) 164709) discloses a urethane potting system for electronic devices, which comprises a mixture of castor oil and ethylene glycol esters of ricinoleic acid. Also, use of plasticizers such as dialkyl phthalates and other oils has been proposed. U.S. Pat. No. 3,714,110 discloses oil-extended urethane systems.

Although these systems possess desired low viscosity, they still have defects. The system comprising glycol esters of ricinoleate exhibits a rather brittle property at low temperature. The oil-extended system is characterized by excessive swelling under conditions of moderately high temperature use, for instance, in encapsulating compositions.

U.S. Pat. No. 4,348,307 discloses another castor oil based urethane system containing monofunctional alcohol, 2-octyldodecanol, which reduces the average hydroxyl functionality of the urethane system and serves to make the cured resin more flexible. This system, however, is rather expensive and it is difficult to control the average hydroxyl functionality and the hardness of the cured resin.

Recently, hydroxyl-containing homopolymers of dienes, hydroxyl-containing copolymers of dienes and/or their hydrogenated derivatives have been employed as a urethane component. Among them, polybutadiene polyols are most commonly used and form flexible polyurethane resins which exhibit a desired elongation even at low temperature.

Polybutadiene based polyols have higher molecular weights and less hydroxyl functionality than castor oil, and therefore form more flexible polyurethanes than castor oil does.

Polybutadiene based polyols, however, have generally too high of a viscosity to be used in a solventless urethane system.

Additionally, polybutadiene based polyols have poor compatibility with well known polyols as polyether polyols, polyester polyols and low molecular weight diols and triols known as chain extenders.

U.S. Pat. No. 4,008,197 and U.S. Pat. No. 4,166,258 disclose mineral oil extended polyurethane systems comprising castor oil and polybutadiene based polyols. Although better compatibility of mineral oil with a polyurethane can be obtained by using a certain coupling agent in those systems, the cured resin obtained exhibits poor stability at relatively high temperature, including weight loss and hardness change.

Japanese Un-examined Patent Publication No. 93717/1983 discloses a urethane composition comprising castor oil, polybutadiene based polyols and plasticizers. But limited compatibility of castor oil with polybutadiene polyols restricts its formulations.

U.S. Pat. No. 4,313,858 discloses a thermally-stable polyurethane system, comprising a polyisocyanate prepolymer, a polyol having pendant vinyl group, a drying oil and a peroxide catalyst. In this system, the drying oil, serving to improve the viscosity and handling characteristics of the system, would react with a double bond of the urethane prepolymer by the aid of a preoxide component, which is cited. Although the Patent system possesses desired low viscosity and would form a thermally-stable polyurethane encapsulating resin, such a system is characterized by a tedious curation of double bond oxidation and a formation of heterogeneous polymer compositions caused by two ways of curation.

An object of this invention is to provide a novel solventless urethane composition, which is useful as casting compounds, encapsulating compounds for electric devices, conformal coatings for printed circuit boards and sealing material for electrical and optical communication cables and cable connectors.

Another object of this invention is to provide a novel urethane composition having the processing advantages typical of urethane systems of desirable low viscosity characteristics.

Further object of this invention is to provide a urethane composition which forms a polyurethane resin of good flexibility and electrical property to meet current requirements.

These and other objects of this invention will become apparent in the detailed descriptions which follow.

SUMMARY OF THE INVENTION

It has now been found that the above-mentioned defects of conventional urethane system can be completely eliminated and the objects of this invention can be attained by providing a new curable urethane composition which comprises a polyhydroxyl component and a polyisocyanate component, the equivalent ratio of said polyisocyanate component to said polyhydroxyl component being 0.8 to 1.4, wherein said polyhydroxyl component comprises 80 to 10% by weight of an interesterification product (A) which is the reaction product of 90 to 20% by weight of castor oil (a1), 10 to 80% by weight of substantially non-hydroxyl-containing naturally occurring triglyceride oil (a2) and 0 to 20% by weight of low molecular weight polyol (a3) based on the reaction product and 20 to 90% by weight of a polybutadiene based polyol (B).

DETAILED DESCRIPTION OF THE INVENTION

A curable urethane composition of this invention comprises a polyhydroxyl component and a polyisocyanate component.

Said polyhydroxyl component comprises an interesterification product (A) and an polybutadiene based polyol (B).

The interesterification product (A) is a reaction product of 90 to 20% by weight of castor oil (a1) and 10 to 80% by weight of substantially non-hydroxyl-containing naturally occurring triglyceride oil (a2) based on the reaction product.

The castor oil (a1) which may be used in this invention is primarily composed of ricinolein which is a glyceride of ricinoleic acid. A typical castor oil comprises a mixture of about 70% by weight of pure glyceryl triricinolein and about 30% by weight of glyceryl diricinolein-monooleate or monolinoleate, and is widely available.

The substantially non-hydroxyl-containing naturally occurring triglyceride oil (a2) which may be used in this invention is exemplified by corn oil, cotton seed oil, peanut oil, olive oil, palm oil, palm kernel oil, sunflower seed oil, coconut oil, safflower oil, poppy seed oil, tea seed oil, kapok oil, rice bran oil, grain sorghum oil, rapeseed oil, linseed oil, soybean oil, perilla oil, hempseed oil, wheat germ oil, rubber seed oil, tung oil, oiticica oil, whale oil, california sardine oil, Japanese sardine oil, menhaden oil, herring oil, fish liver oil, lard, and tallows. These oils have a hydroxyl value of less than 5.0.

Interesterification is carried out in a usual way with a well known catalyst such as alkali metal hydroxides, alkali metal alcoholates, sodium carbonate, litharge and a mixture of the above-mentioned catalysts.

The reaction temperature range is 170°–260° C., and the reaction time varies from 15 minutes to 6 hours.

The interesterification should be carried out in the following weight proportion, castor oil (a1) being 90 to 20% by weight and substantially non-hydroxyl-containing naturally occurring triglyceride oil (a2) being 10 to 80% by weight based on the reaction product, the preferred proportion being 80 to 30% by weight and 20 to 70% by weight, respectively.

Such proportion is a highly important aspect of this invention. If the weight of castor oil (a1) is more than 90% by weight based on the weight of the reaction product, the reaction product would have poor compatibility with polybutadiene based polyols (B). If the proportion of castor oil (a1) is less than 20% by weight based on the reaction product, the product does not have enough hydroxyl functionality to form polyurethane resin with good mechanical and physical properties.

In the interesterification, low molecular weight polyols (a3) having a molecular weight of less than 200 such as ethylene glycol, propylene glycol, butane diol, hexanediol, neopentyl glycol, glycerol, trimethylolpropane and the like can be optionally used in an amount of less than 20% by weight based on the reaction product as long as the viscosity of the reaction product is lower than that of castor oil (a1) and the product has good compatibility with polybutadiene based polyols (B).

The interesterification products (A) thus obtained have good compatibility with polybutadiene based polyols (B).

The polybutadiene based polyols (B) which can be used in this invention include the hydroxyl-containing homopolymer of butadiene, hydroxyl-containing copolymer of butadiene and their hydrogenated derivatives. A typical polybutadiene based polyols (B) is available from Arco Chemical Company under the trademark "POLY BD". Hydrogenated polybutadiene polyols are made of Mitsubishi Chemical Industries LTD. Under the trademark "POLYTAIL".

These polybutadiene based polyols (B) have a too high viscosity to be used in a solventless system and poor compatibility with almost all kinds of polyols.

The above mentioned interesterfication products (A) have an excellent compatibility with the polybutadiene based polyols (B) and in addition improves the mechanical properities of the cured resin.

The proportion of the interesterification products (A) and the polybutadiene based polyols (B) in the polyhydroxyl component of this invention can vary from 80 to 10% by weight and from 20 to 90% by weight, respectively, the preferred proportion being 70 to 20% by weight and 30 to 80% by weight, respectively.

The polyhydroxyl component of this invention may contain other polyols, for example, castor oil.

The polyisocyanate component which can be used in this invention includes tolylene diisocyanate, diphenylmethane diisocyanate, diphenylmethane diisocyanate modified with carboniimide, naphthalene diisocyanate, xylene diisocyanate, diphenylsulphone diisocyanate, triphenylmethane diisocyanate, hexamethylene diisocyanate, 3-isocyanate methyl cyclohexyl isocyanate, diphenylpropane diisocyanate, phenylene diisocyanate, cyclohexylene diisocyanate, 3,3'-diisocyanate dipropyl ether, triphenylmethane triisocyanate, isophorone diisocyanate and diphenyl-4,4'-diisocyanate. Isocyanate terminated prepolymers from the above mentioned polyisocyanate can also be used. Diphenylmethane diisocyanate modified with carbodiimide is preferably used.

The equivalent ratio of the polyisocyanate component to the polyhydroxyl component varies from 0.8 to 1.4, the preferred ratio being 0.9 to 1.3.

Curing reaction of isocyanate group and hydroxyl group can occur at room temperature, however, heating may optionally be employed.

The compositions of this invention may be further modified by the addition of any other materials such as fillers, pigments, plasticizers, antioxidants, antiflaming agents, and ultraviolet absorbents considerably depending upon the final use for the products.

Reduction of castor oil's hydroxyl functionality through the interesterification of castor oil (a1) with substantially non-hydroxyl-containing naturally occurring triglyceride oil (a2) leads to the following desirable results.

(1) The polyurethane resins obtained have good electrical property.

(2) The obtained resins have an excellent elongation property.

(3) The interesterification gives the product an exellent compatibility with polybutadiene based polyols (B).

(4) The interesterification products (A) reduce the viscosity of the composition to improve processing and prolong pot-life.

A further understanding of the present invention may be obtained with reference to the following examples. It is to be understood that the invention is not limited to the embodiments described in the examples.

The following examples consist of three parts. The first part is the synthesis part, in which the preparation of interesterification product (A) produced by reaction of castor oil (a1) and substantially non-hydroxyl-containing naturally occurring triglyceride oil (a2) is described. In the second part, compatibility of the interesterification products (A) with polybutadiene based polyols (B) is tested. The last part shows the properties of the cured resins obtained.

EXAMPLES

(Part-I)

SYNTHESIS EXAMPLE 1

In a 3-necked round bottom flask 170 g of castor oil (hydroxyl value: 160, viscosity: 700 cps. at 25° C.), 30 g of coconut oil (hydroxyl value: 0.2) and 0.6 g of sodium carbonate were charged and stirred under a nitrogen atmosphere. The mixture was heated by a mantle and allowed to rise to 180° C. after 20 minutes and to 230° C. after 30 minutes, and maintained at this temperature for 90 minutes. Then the mixture was cooled to room temperature. An oily product was obtained.

The interesterification product had a hydroxyl value of 137, moisture of 0.01%, and a viscosity of 484 cps. at 25° C.

SYNTHESIS EXAMPLE 2

In a flask 100 g of castor oil, 100 g of rapeseed oil and 2 g of 28% sodium methylate in methanol solution were charged and reacted in the same way as in SYNTHESIS EXAMPLE 1.

The interesterification product obtained had a hydroxyl value of 84 and a viscosity of 172 cps. at 25° C.

SYNTHESIS EXAMPLE 3

In a flask 84 g of castor oil, 116 g of linseed oil and 0.4 g of sodium carbonate were charged and reacted in the same way as in SYNTHESIS EXAMPLE 1.

The interesterification product obtained had a hydroxyl value of 68 and a viscosity of 141 cps. at 25° C.

SYNTHESIS EXAMPLE 4

In a flask 142 g of castor oil, 58 g of lard and 0.6 g of sodium carbonate were charged and reacted in the same way as in SYNTHESIS EXAMPLE 1.

The interesterification product obtained had a hydroxyl value of 115 and a viscosity of 302 cps. at 25° C.

SYNTHESIS EXAMPLE 5

In a flask 93 g of castor oil, 90 g of rapeseed oil, 13.4 g of trimethylolpropane and 2 g of 28% sodium methylate in methanol solution were charged and reacted in the same way as in SYNTHESIS EXAMPLE 1.

The interesterification product obtained had a hydroxyl value of 156 and a viscosity of 210 cps. at 25° C.

The summary of the above mentioned examples was shown in Table 1.

TABLE 1

| SYN. EX. | Material charged (g) | | | Product | |
|---|---|---|---|---|---|
| | a1 | a2 | a3 | OH value | Viscosity |
| 1 | 170 | 30 coconut oil | | 137 | 484 |
| 2 | 100 | 100 rapeseed oil | | 84 | 172 |
| 3 | 84 | 116 linseed oil | | 68 | 141 |
| 4 | 142 | 58 lard | | 115 | 302 |
| 5 | 93 | 90 rapeseed oil | 13.4 TMP | 156 | 210 |

(Notes)
TMP: Trimethylolpropane
Viscosity: cps. at 25° C.

(Part-II)

Tests an compatibility of the interesterification products (A) with polybutadiene based polyols (B).

TEST EXAMPLE 1

Compatibility of the interesterification product obtained in SYNTHESIS EXAMPLE 2 with POLY BD R-45HT was tested under various conditions.

The two substances were mixed at various ratio and the appearance of the mixture was observed after standing at a fixed temperature.

POLY BD R-45HT used in this test is a homopolymer of butadiene made by Arco Chemicals, typically having an average molecular weight of 2,800, a hydroxyl functionality of 2.3, a hydroxyl value of 46 and an iodine number of 398.

The results are shown in Table 2.

COMPARATIVE TEST EXAMPLE 1

Compatibility of castor oil with POLY BD R-45HT was carried out in the same manner as in TEST EXAMPLE 1.

The results are also shown in Table 2.

TABLE 2

| | | | Compatibility | |
|---|---|---|---|---|
| | | Ratio | 24 hrs., 25° C. | 24 hrs., 0° C. |
| TEST EX. 1 | B:A | 9:1 | clear | clear |
| | | 8:2 | clear | clear |
| | | 7:3 | clear | clear |
| | | 6:4 | clear | clear |
| | | 5:5 | clear | clear |
| | | 4:6 | clear | turbid |
| COM. TEST EX. 1 | B:a1 | 9:1 | clear | clear |
| | | 8:2 | clear | clear |
| | | 7:3 | two layers | two layers |
| | | 6:4 | two layers | two layers |
| | | 5:5 | two layers | two layers |
| | | 4:6 | two layers | two layers |

(Notes)
A: Interesterification product
B: Polybutadiene based polyol, POLY BD R-45 HT
a1: Castor oil

TEST EXAMPLE 2

Compatibility of the interesterification product obtained in SYNTHESIS EXAMPLE 3 with POLY BD R-45HT was tested in the same manner as in TEST EXAMPLE 1.

The results are shown in Table 3.

TABLE 3

| | Ratio | Compatibility | |
|---|---|---|---|
| | | 24 hrs., 25° C. | 24 hrs., 0° C. |
| TEST EX. 2 | B:A  9:1 | clear | clear |
| | 8:2 | clear | clear |
| | 7:3 | clear | clear |
| | 6:4 | clear | clear |
| | 5:5 | clear | clear |
| | 4:6 | clear | clear |

(Notes)
A: Interesterification product
B: Polybutadiene based polyol, POLY BD R-45 HT

TEST EXAMPLE 3

A mixture of 4 parts by weight of the interesterification product obtained in SYNTHESIS EXAMPLE 2 and 6 parts by weight of the hydrogenated polybutadiene polyol, POLYTAIL HA, was tested in the same manner as in TEST EXAMPLE 1 and the mixture was found to remain a clear solution even at 0° C.

POLYTAIL HA used in this test is a hydrogenated polybutadiene polyol made by Mitsubishi Chemical Industries LTD., typically having a hydroxyl value of 48 and a viscosity of over 800 ps. at 25° C.

COMPARATIVE TEST EXAMPLE 2

A mixture of castor oil and the hydrogenated polybutadiene polyol, POLYTAIL HA, was tested at various ratio in the same manner as in TEST EXAMPLE 3.

Even in the case of mixing 90% by weight of castor oil and 10% by weight of POLYTAIL HA, a clear mixture was not obtained.

(Part-III)

CURING TEST EXAMPLE 1

50 parts by weight of the interesterification product obtained in SYNTHESIS EXAMPLE 2 and 50 parts by weight of POLY BD R-45HT were mixed, and to the resulting clear homogeneous mixture 18 parts by weight of carbodiimide modified liquid diphenylmethane diisocyanate. Millionate MTL made by Nippon Polyurethane Industries LTD. (NCO content: 29%), was added. In this case, the equivalent ratio of isocyanate to hydroxyl is 1.05.

After degassing under vacuum, the mixture was poured into a mold and cured at 120° C. for one hour. Viscosity of the polyhydroxyl component and properties of the resulted polyurethane resin are shown in Table 4.

CURING TEST EXAMPLE 2

30 parts by weight of the interesterification product obtained in SYNTHESIS EXAMPLE 3 and 70 parts by weight of POLY BD R-45HT were mixed, and to the resulting clear homogeneous mixture 14 parts by weight of carbodiimide modified liquid diphenylmethane diisocyanate was added.

A curing test was carried out in the same manner as in CURING TEST EXAMPLE 1.

The results are shown in Table 4.

CURING TEST EXAMPLE 3

40 parts by weight of the interesterification product obtained in SYNTHESIS EXAMPLE 4 and 60 parts by weight of POLY BD R-45HT were mixed, and to the resulting clear homogeneous mixture 20 parts by weight of carbodiimide modified liquid diphenylmethane diisocyanate was added.

A curing test was carried out in the same manner as in CURING TEST EXAMPLE 1.

The results are shown in Table 4.

COMPARATIVE CURING TEST EXAMPLE 1

100 parts by weight of POLY BD R-45HT was used with 12 parts by weight of carbodiimide modified liquid diphenylmethane diisocyanate and a curing test was carried out in the same manner as in CURING TEST EXAMPLE 1.

Viscosity of the urethane mixture and the properties of the polyurethane resin obtained are shown in Table 4.

TABLE 4

| | CURING TEST EXAMPLE | | | COM. CUR. TEST EX. 1 |
|---|---|---|---|---|
| | 1 | 2 | 3 | |
| viscosity of polyhydroxyl component (ps./25° C.) | 15.0 | 32.0 | 25.5 | 68.0 |
| tensile strength (kg/cm$^2$) | 14 | 14 | 18 | 14 |
| tear strength (kg/cm) | 5 | 6 | 7 | 6 |
| elongation at break (%) | 280 | 430 | 750 | 140 |
| volume resistivity ($\Omega \cdot$ cm) | $2 \times 10^{15}$ | $1 \times 10^{15}$ | $3 \times 10^{15}$ | $2 \times 10^{15}$ |

CURING TEST EXAMPLE 4

30 parts by weight of the interesterification product obtained in SYNTHESIS EXAMPLE 5 and 70 parts by weight of POLY BD R-45HT were mixed, and to the resulting clear homogeneous mixture 21 parts by weight of carboniimide modified liquid diphenylmethane diisocyanate was added.

A curing test was carried out in the same manner as in CURING TEST EXAMPLE 1.

The results are shown in Table 5.

CURING TEST EXAMPLE 5

50 parts by weight of the interesterification product obtained in SYNTHESIS EXAMPLE 5 and 50 parts by weight of POLY BD R-45HT were mixed, and to the resulting clear homogeneous mixture 27 parts by weight of carbodiimide modified liquid diphenylmethane diisocyanate was added.

A curing test was carried out in the same manner as in CURING TEST EXAMPLE 1.

The results are shown in Table 5.

CURING TEST EXAMPLE 6

70 parts by weight of the interesterification product obtained in SYNTHESIS EXAMPLE 5 and 30 parts by weight of POLY BD R-45HT were mixed, and to the resulting clear homogeneous mixture 33 parts by weight of carbodiimide modified liquid diphenylmethane diisocyanate was added.

A curing test was carried out in the same manner as in CURING TEST EXAMPLE 1.

The results are shown in Table 5. The results of COMPARATIVE CURING TEST EXAMPLE 1 are again shown in Table 5.

TABLE 5

|  | CURING TEST EXAMPLE 4 | CURING TEST EXAMPLE 5 | CURING TEST EXAMPLE 6 | COM. CUR. TEST EX. 1 |
|---|---|---|---|---|
| viscosity of polyhydroxyl component (ps./25° C.) | 31.0 | 16.0 | 8.3 | 68.0 |
| tensile strength (kg/cm$^2$) | 24 | 38 | 37 | 14 |
| tear strength (kg/cm) | 8 | 9 | 9 | 6 |
| elongation at break (%) | 473 | 643 | 700 | 140 |
| hardness (Shore A) | 48 | 50 | 58 | 46 |

CURING TEST EXAMPLE 7

40 parts by weight of the interesterification product obtained in SYNTHESIS EXAMPLE 2 and 60 parts by weight of a hydrogenated polybutadiene polyol, POLYTAIL HA made by Mitsubishi Chemical Industries LTD., were mixed.

Then, 17 parts by weight of carbodiimide modified diphenylmethane diisocyanate was added and cured as in CURING TEST EXAMPLE 1.

The results are shown in Table 6.

COMPARATIVE CURING TEST EXAMPLE 2

70 parts by weight of POLYTAIL HA and 30 parts by weight of dioctyl phthalate were mixed. Then, 9 parts by weight of carbodiimide modified diphenylmethane diisocyanate was added and cured as in CURING TEST EXAMPLE 1.

The results are shown in Table 6.

COMPARATIVE CURING TEST EXAMPLE 3

POLYTAIL HA was found to have too high of a viscosity to be used alone as a polyhydroxyl component in solventless urethane systems.

POLYTAIL HA was also found to have poor compatibility with castor oil and could not be used with castor oil at any rates.

TABLE 6

|  | CURING TEST EXAMPLE 7 | COM. CURING TEST EXAMPLE 2 |
|---|---|---|
| viscosity of polyhydroxyl component (ps./25° C.) | 52.1 | 54.2 |
| tensile strength (kg/cm$^2$) | 14 | 6 |
| tear strength (kg/cm) | 5 | 2 |
| elongation at break (%) | 620 | 680 |
| hardness (Shore A) | 24 | 3 |

CURING TEST EXAMPLE 8

50 parts by weight of the interesterification product obtained in SYNTHESIS EXAMPLE 5 and 50 parts by weight of a hydroxyl-containing polybutadiene, G-1000 made by Nippon Soda Company, Limited (hydroxyl value: 73.3, viscosity: over 800 ps./25° C.), were mixed to form a clear homogeneous mixture. Then, 31 parts by weight of carbodiimide modified diphenylmethane diisocyanate was added and a curing test was carried out as in CURING TEST EXAMPLE 1.

The results are shown in Table 7.

COMPARATIVE CURING TEST EXAMPLE 4

100 parts by weight of polybutadiene polyol, G-1000, and 20 parts by weight of carrbodiimide modified diphenylmethane diisocyanate were mixed, and cured in the same manner as in CURING TEST EXAMPLE 1.

The results are shown in Table 7.

This example test was difficult to carry out because of high viscosity.

TABLE 7

|  | CURING TEST EXAMPLE 8 | COM. CURING TEST EXAMPLE 4 |
|---|---|---|
| viscosity of polyhydroxyl component (ps./25° C.) | 23.2 | over 800 |
| tensile strength (kg/cm$^2$) | 50 | 42 |
| tear strength (kg/cm) | 16 | 17 |
| elongation at break (%) | 730 | 700 |
| hardness (Shore A) | 74 | 54 |

CURING TEST EXAMPLE 9

20 parts by weight of the interesterification product obtained in SYNTHESIS EXAMPLE 5, 20 parts by weight of castor oil and 60 parts by weight of POLY BD R-45HT were mixed to form a clear homogeneous mixture. Then, 24 parts by weight of isophorone diisocyanate (NCO content: 37.5%) and 0.37 part by weight of dibutyltin dilaurate were added.

After degassing under vacuum, the mixture was poured into a mold and cured at 120° C. for two hours. In this case, the equivalent ratio of isocyanate to hydroxyl is 1.30.

The results are shown in Table 8.

COMPARATIVE CURING TEST EXAMPLE 5

100 parts by weight of POLY BD R-45HT, 12 parts by weight of isophorone diisocyanate and 0.34 part by weight of dibutyltin dilaurate were mixed, and cured in the same manner as in CURING TEST EXAMPLE 9. In this case, the equivalent ratio of isocyanate to hydroxyl is 1.30.

The results are shown in Table 8.

TABLE 8

|  | CURING TEST EXAMPLE 9 | COM. CURING TEST EXAMPLE 5 |
|---|---|---|
| viscosity of polyhydroxyl component (ps./25° C.) | 25 | 68 |
| tensile strength (kg/cm$^2$) | 15 | 10 |
| tear strength (kg/cm) | 8 | 5 |
| elongation at break (%) | 510 | 250 |
| hardness (Shore A) | 38 | 44 |

CURING TEST EXAMPLE 10

In a flask 811 g of isophorone diisocyanate and 558 g of castor oil were charged and stirred at 80° C. for 3 hours. The isophorone diisocyanate prepolymer obtained had a NCO content of 17.5% and a viscosity of 1860 cps. at 25° C.

30 parts by weight of the interesterification product obtained in SYNTHESIS EXAMPLE 5 and 70 parts by weight of POLY BD R-45HT were mixed to form a clear homogeneous mixture. Then, 41 parts by weight of the above isophorone diisocyanate prepolymer and 0.42 part by weight of dibutyltin dilaurate were added. In this case, the equivalent ratio of isocyanate to hydroxyl is 1.20. The curing test was carried out as in CURING TEST EXAMPLE 9.

The results are shown in Table 9.

COMPARATIVE CURING TEST EXAMPLE 6

100 parts by weight of POLY BD R-45HT, 24 parts by weight of isophorone diisocyanate prepolymer obtained in CURING TEST EXAMPLE 10 and 0.37 part by weight of dibutyltin dilaurate were mixed, and cured in the same manner as in CURING TEST EXAMPLE 9.

The results are shown in Table 9.

COMPARATIVE CURING TEST EXAMPLE 7

80 parts by weight of POLY BD R-45HT, 20 parts by weight of dioctyl phthalate, 19 parts by weight of isophorone diisocyanate prepolymer obtained in CURING TEST EXAMPLE 10 and 0.36 parts by weight of dibutyltin dilaurate were mixed, and cured in the same manner as in CURING TEST EXAMPLE 9.

The results are shown in Table 9.

TABLE 9

| | CUR. TEST EX. 10 | COM. CUR. TEST EX. 6 | COM. CUR. TEST EX. 7 |
|---|---|---|---|
| viscosity of polyhydroxyl component (ps./25° C.) | 31 | 68 | 32 |
| tensile strength (kg/cm$^2$) | 14 | 14 | 9 |
| tear strength (kg/cm) | 6 | 6 | 4 |
| elongation at break (%) | 490 | 270 | 240 |
| hardness (shore A) | 32 | 43 | 34 |

What is claimed is:

1. A new curable urethane composition which comprises a polyhydroxyl component and a polyisocyanate component, the equivalent ratio of said polyisocyanate component to said polyhydroxyl component being 0.8 to 1.4, wherein said polyhydroxyl component comprises 80 to 10% by weight of an interesterification product (A) which is the reaction product of 90 to 20% by weight of castor oil (a1), 10 to 80% by weight of substantially non-hydroxyl-containing naturally occurring triglyceride oil (a2) and 0 to 20% by weight of low molecular weight polyol (a3) based on the reaction product and 20 to 90% by weight of a polybutadiene based polyol (B).

2. The curable urethane composition of claim 1 wherein said substantially non-hydroxyl-containing naturally occurring triglyceride oil (a2) is an oil having a hydroxyl value of less than 5.0.

3. The curable urethane composition of claim 1 wherein said low molecular weight polyol (a3) is a polyol having a molecular weight of less than 200.

4. The curable urethane composition of claim 1 wherein said polybutadiene based polyol (B) is a hydroxyl-containing homopolymer of butadiene, hydroxyl-containing copolymer of butadiene or their hydrogenated derivatives.

5. The curable urethane composition of claim 1 wherein said polyisocyanate component is a diphenylmethane diisocyanate modified with carbodiimide, an isophorone diisocyanate or an isocyanate terminated prepolymer.

6. The curable urethane composition of claim 5 wherein said isocyanate terminated prepolymer is a prepolymer derived from isophorone diisocyanate.

7. The curable urethane composition of claim 1 wherein said low molecular weight polyol (a3) is a polyol having a molecular weight of less than 200 and said polybutadiene based polyol (B) is a hydroxyl-containing homopolymer of butadiene, hydroxyl-containing copolymer of butadiene or their hydrogenated derivatives.

8. The curable urethane composition of claim 1 wherein said low molecular weight polyol (a3) is a polyol having a molecular weight of less than 200, said polybutadiene-based polyol (B) is a hydroxyl-containing homopolymer of butadiene, hydroxyl-containing copolymer of butadiene or their hydrogenated derivatives and said polyisocyanate component is a diphenylmethane diisocyanate modified with carbodiimide, an isophorone diisocyanate or an isocyanate terminated prepolymer.

9. The curable urethane composition of claim 8 wherein said polyisocyanate component is a diphenylmethane diisocyanate modified with carbodiimide.

* * * * *